(12) United States Patent
Benzoni et al.

(10) Patent No.: US 7,625,132 B2
(45) Date of Patent: Dec. 1, 2009

(54) PACKAGING FOR A FIBER-COUPLED OPTICAL DEVICE

(75) Inventors: Albert M. Benzoni, South Pasadena, CA (US); Joel S. Paslaski, San Gabriel, CA (US); Peter C. Sercel, Pasadena, CA (US)

(73) Assignee: HOYA Corporation USA, San Jose, CA (US)

( * ) Notice: Subject to any disclaimer, the term of this patent is extended or adjusted under 35 U.S.C. 154(b) by 64 days.

(21) Appl. No.: 11/754,986

(22) Filed: May 29, 2007

(65) Prior Publication Data

US 2007/0223864 A1 Sep. 27, 2007

Related U.S. Application Data

(63) Continuation of application No. 11/171,469, filed on Jun. 29, 2005, now Pat. No. 7,223,025.

(60) Provisional application No. 60/584,654, filed on Jun. 30, 2004.

(51) Int. Cl.
  G02B 6/36 (2006.01)
  G02B 6/30 (2006.01)
  G02B 6/26 (2006.01)
  G02B 6/00 (2006.01)

(52) U.S. Cl. .................. 385/88; 385/83; 385/49; 385/137; 385/39

(58) Field of Classification Search .............. 385/49, 385/50, 136, 137, 65, 83, 88, 89, 62, 81
See application file for complete search history.

(56) References Cited

U.S. PATENT DOCUMENTS

| | | | |
|---|---|---|---|
| 4,830,456 A | 5/1989 | Kakii et al. | |
| 4,983,012 A | 1/1991 | Saito et al. | |
| 5,125,057 A | 6/1992 | Aberson et al. | |
| 5,687,267 A | 11/1997 | Uchida | |
| 5,737,467 A | 4/1998 | Kato et al. | |
| 5,961,849 A | 10/1999 | Bostock et al. | |
| 6,122,430 A * | 9/2000 | Bookbinder et al. | 385/137 |
| 6,238,100 B1 | 5/2001 | Sasaki et al. | |
| 6,483,968 B2 | 11/2002 | Fuse et al. | |
| 6,530,701 B2 * | 3/2003 | Jin | 385/94 |

(Continued)

FOREIGN PATENT DOCUMENTS

WO  WO03085431  * 10/2003

(Continued)

OTHER PUBLICATIONS

Office Action dated Oct. 23, 2006 in parent U.S. Appl. No. 11/171,469 (now Pat No. 7,223,025).

(Continued)

*Primary Examiner*—Charlie Peng
(74) *Attorney, Agent, or Firm*—David S. Alavi

(57) ABSTRACT

A segment of optical fiber is engaged with a fiber groove on a device substrate, which positions the fiber segment for optical coupling with an optical component on the substrate. A fiber retainer maintains the fiber segment in engagement with the groove. The fiber retainer may be secured to the substrate with adhesive means. The adhesive means forms at least one retaining member that at least partially fills at least one recessed region formed on the device substrate or on the fiber retainer. That recessed region is spatially separate from the fiber groove and from an area of the fiber retainer engaged with the fiber.

17 Claims, 19 Drawing Sheets

U.S. PATENT DOCUMENTS

| | | | | |
|---|---|---|---|---|
| 6,676,301 | B2 * | 1/2004 | Chan et al. | 385/83 |
| 6,811,853 | B1 * | 11/2004 | Sherrer et al. | 428/138 |
| 6,842,558 | B2 | 1/2005 | Mitsuoka et al. | |
| 6,942,397 | B2 | 9/2005 | Benzoni et al. | |
| 7,035,485 | B2 * | 4/2006 | Kondo et al. | 385/2 |
| 7,223,025 | B2 | 5/2007 | Benzoni et al. | |
| 2005/0129380 | A1 * | 6/2005 | Takeuchi et al. | 385/137 |
| 2005/0157972 | A1 * | 7/2005 | Kuhara et al. | 385/14 |

OTHER PUBLICATIONS

Notice of Allowance dated Feb. 23, 2007 in parent U.S. Appl. No. 11/171,469 (now Pat No. 7,223,025).

International Search Report for counterpart App No. PCT/US2005/023166.

International Preliminary Report on Patentablility for counterpart App No. PCT/U52005/023166.

Abe et al, "Study of surface mounting of PLC on optical fibre circuit board", "Electronics Letters", May 10, 2001, pp. 623-624, vol. 37, No. 10.

Asakawa et al, "PLC connector with fibre physical contact", "Electronics Letters", Sep. 25, 1997, pp. 1730-1731, vol. 33, No. 20.

Asakawa et al, "PLC Connector w PLC-Fiber Physical Contact for Multichannel Receptacle PLC Modules for Optical Circuit Board Integration", "Journal of Lightwave Technology", Mar. 2003, pp. 821-830, vol. 21, No. 3.

* cited by examiner

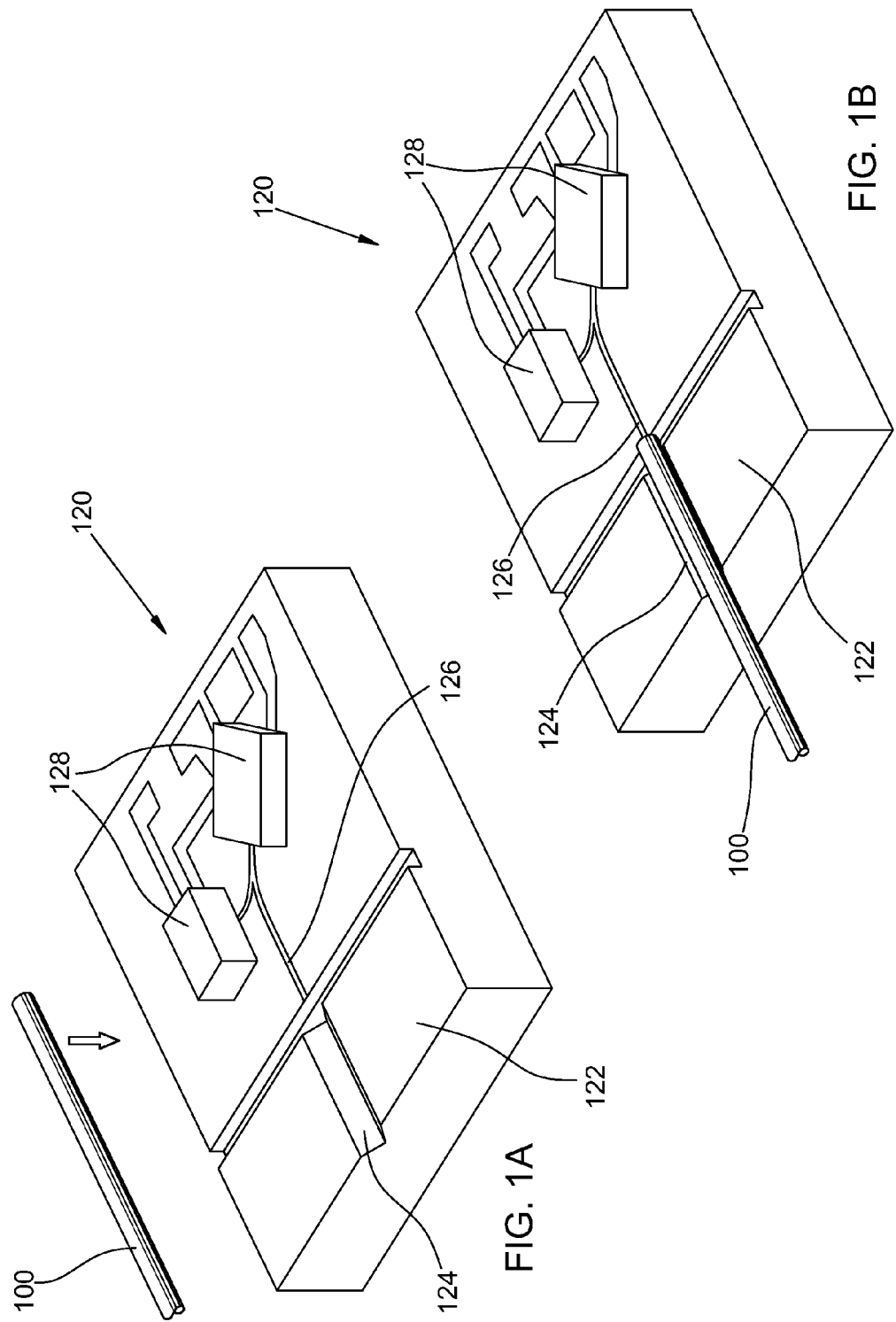

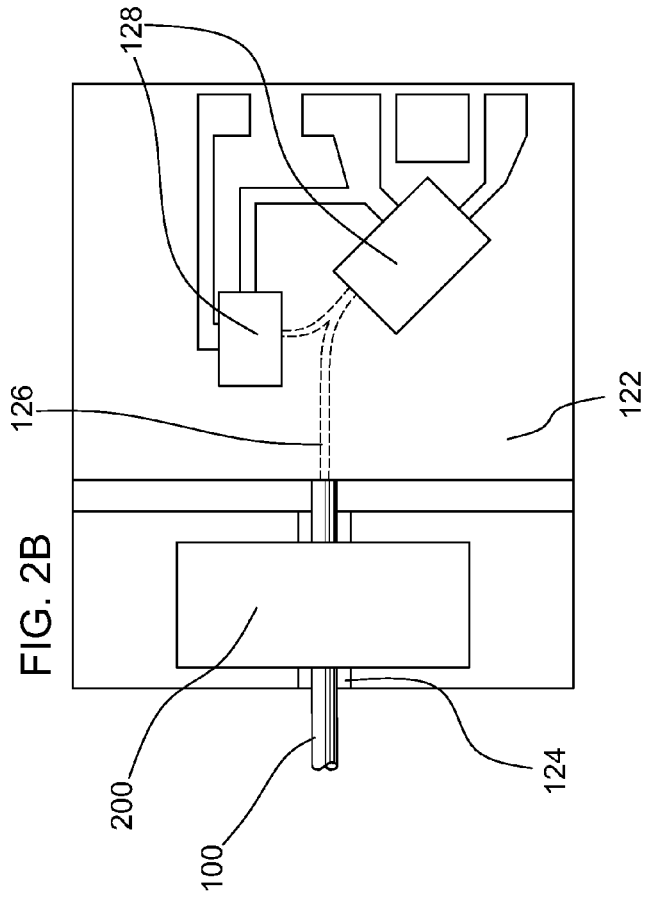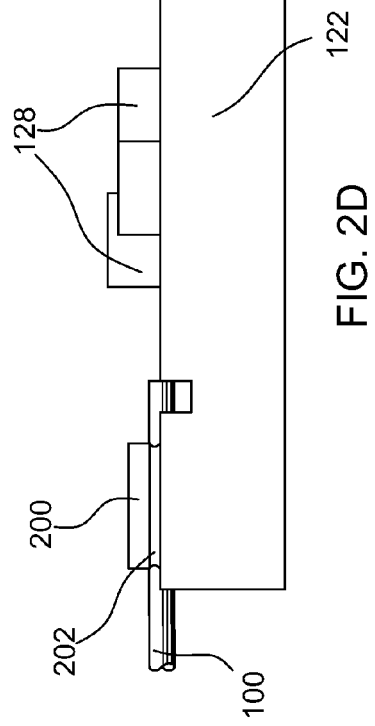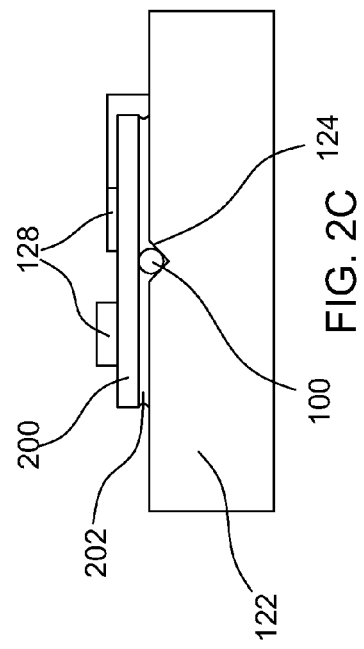

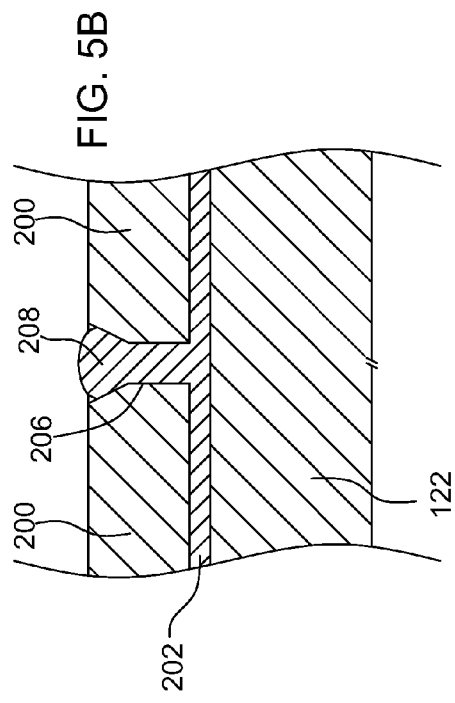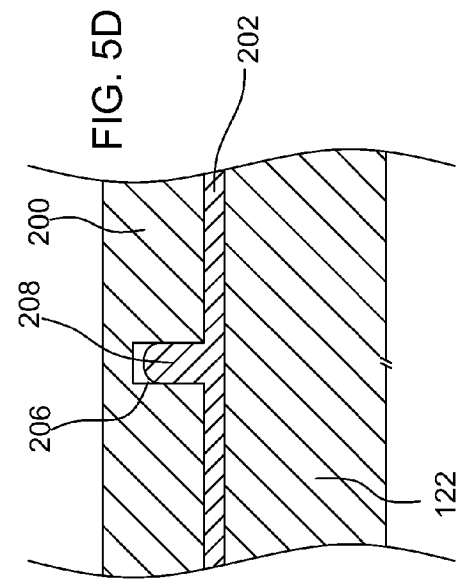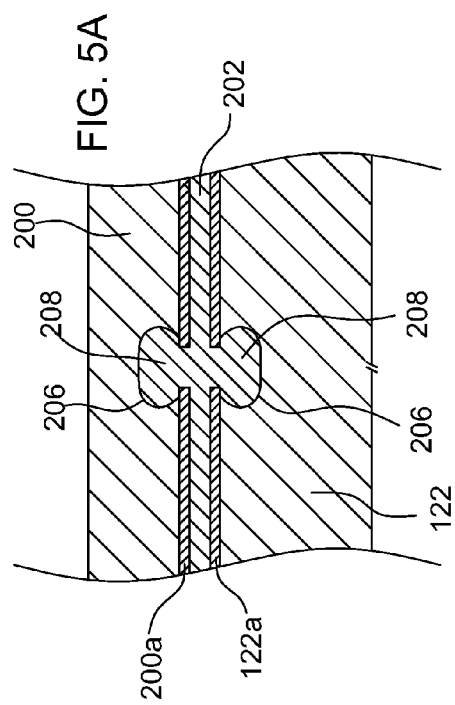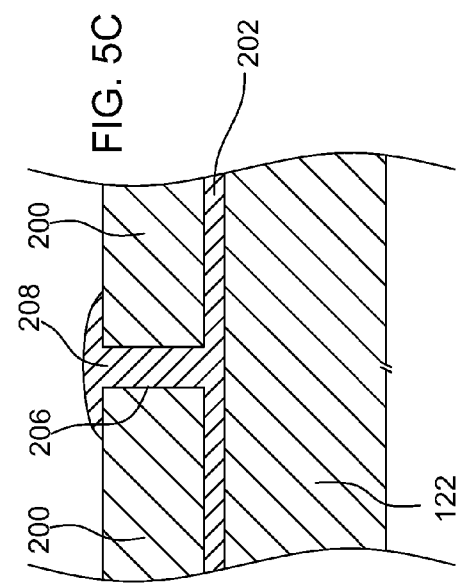

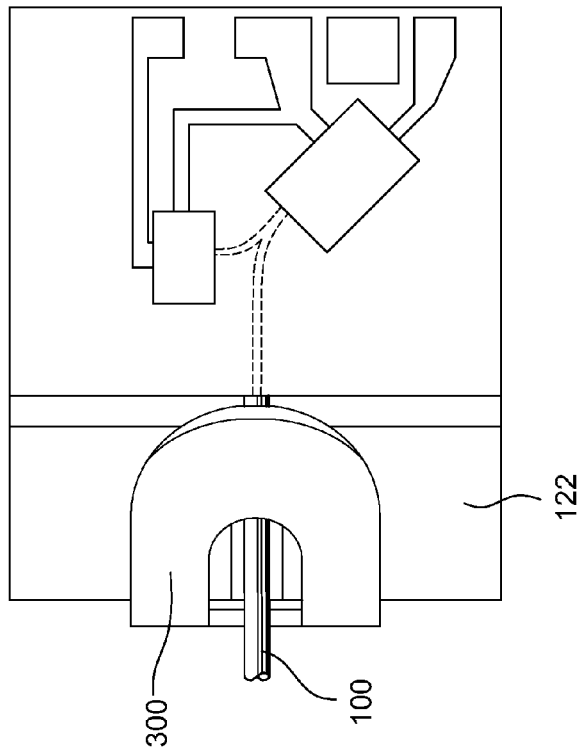
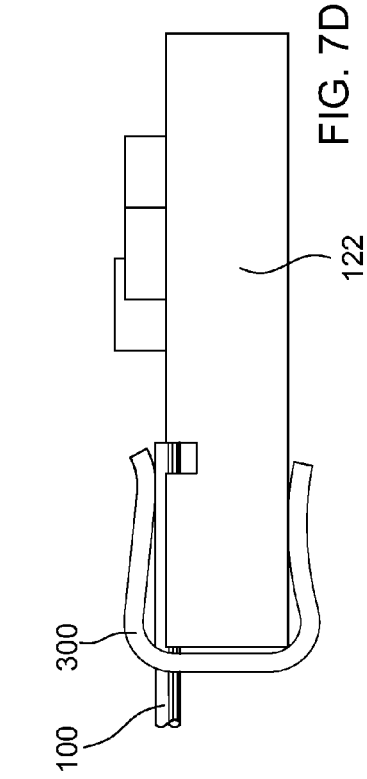
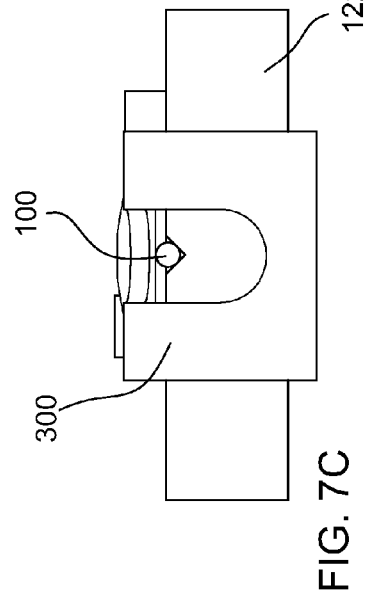

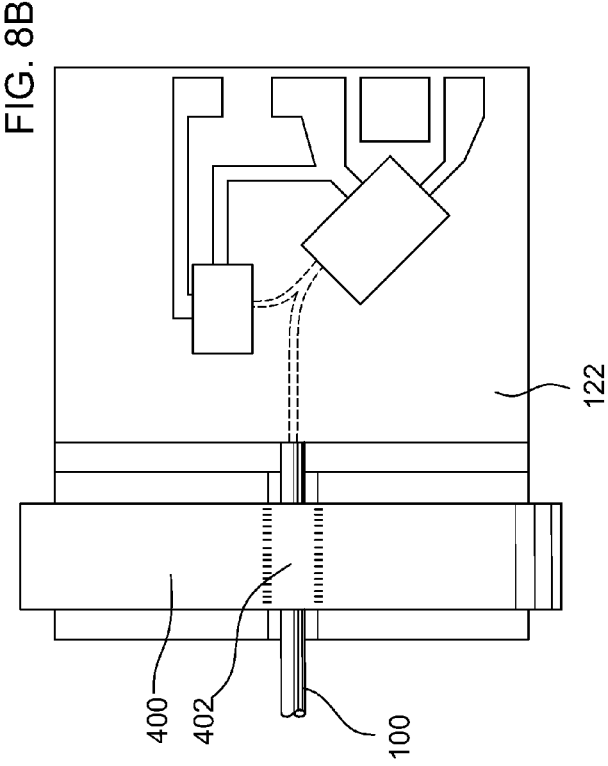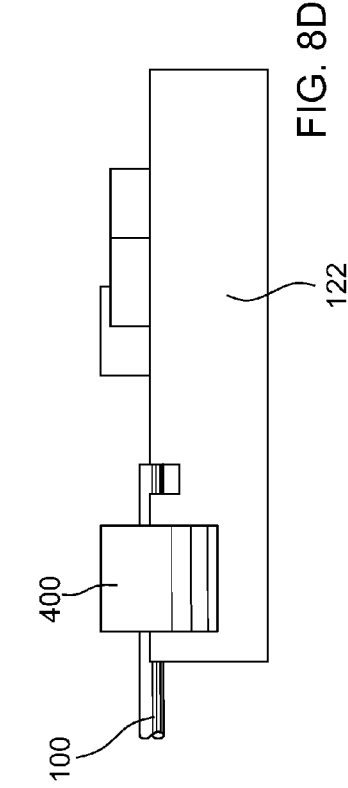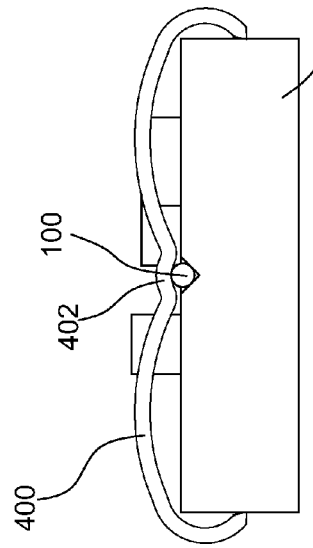

PACKAGING FOR A FIBER-COUPLED OPTICAL DEVICE

BENEFIT CLAIMS TO RELATED APPLICATIONS

This application is a continuation of U.S. non-provisional application Ser. No. 11/171,469 filed Jun. 29, 2005 (now U.S. Pat. No. 7,223,025), which in turn claims benefit of U.S. provisional App. No. 60/584,654 filed Jun. 30, 2004, both of said applications being hereby incorporated by reference as if fully set forth herein.

BACKGROUND

The field of the present invention relates to optical devices coupled to optical fibers. Packaging of fiber-coupled optical devices is disclosed herein.

Packaging an optical component for ready coupling to an optical fiber is a costly and time consuming portion of the manufacturing process for optical devices for telecommunications. Connectors are available for enabling rapid connection between optical fibers, each fiber being provided with one of a pair of mating connectors. In order to provide a packaged optical device with such a connector, it is often the case that a short segment of optical fiber is employed within the package, with one end optically coupled to the device and the other end terminating in the connector and available for coupling to another optical fiber with a mating connector.

Disclosed herein are apparatus and methods for providing a packaged fiber-coupled optical device that incorporates a segment of optical fiber. The configuration of the package subassemblies enables the optical device to be readily assembled with and optically coupled to the optical fiber segment, and thereby to be provided with a fiber-optic connector.

SUMMARY

An optical apparatus comprises: a device substrate with at least one optical component thereon and with a fiber groove thereon; a segment of optical fiber with a first end thereof engaged with the fiber groove, the fiber groove positioning the first end of the fiber segment engaged therewith for optical coupling with at least one optical component on the substrate; a fiber retainer positioned over the first end of the fiber segment so as to maintain the first end thereof in engagement with the fiber groove; and adhesive means for securing the fiber retainer to the device substrate. The adhesive means forms at least one retaining member that at least partially fills at least one recessed region formed on the device substrate or on the fiber retainer. That recessed region is spatially separate from the fiber groove and from an area of the fiber retainer engaged with the fiber.

Objects and advantages pertaining to packaged fiber-coupled optical devices may become apparent upon referring to the disclosed embodiments as illustrated in the drawings and disclosed in the following written description and/or claims.

BRIEF DESCRIPTION OF THE DRAWINGS

FIGS. 1A-1B illustrate an optical device assembly and an optical fiber segment.

FIGS. 2A-2D illustrate an optical device assembly, and optical fiber segment, and a fiber retaining plate.

FIGS. 4A-4D, 5A-5D, and 6A-6D illustrate various configurations of retaining members formed by adhesive in recessed regions.

FIGS. 7A-7D illustrate an optical device assembly, an optical fiber segment, and a resilient fiber retainer.

FIGS. 8A-8D illustrate an optical device assembly, an optical fiber segment, and a resilient fiber retainer.

Figure 2A:
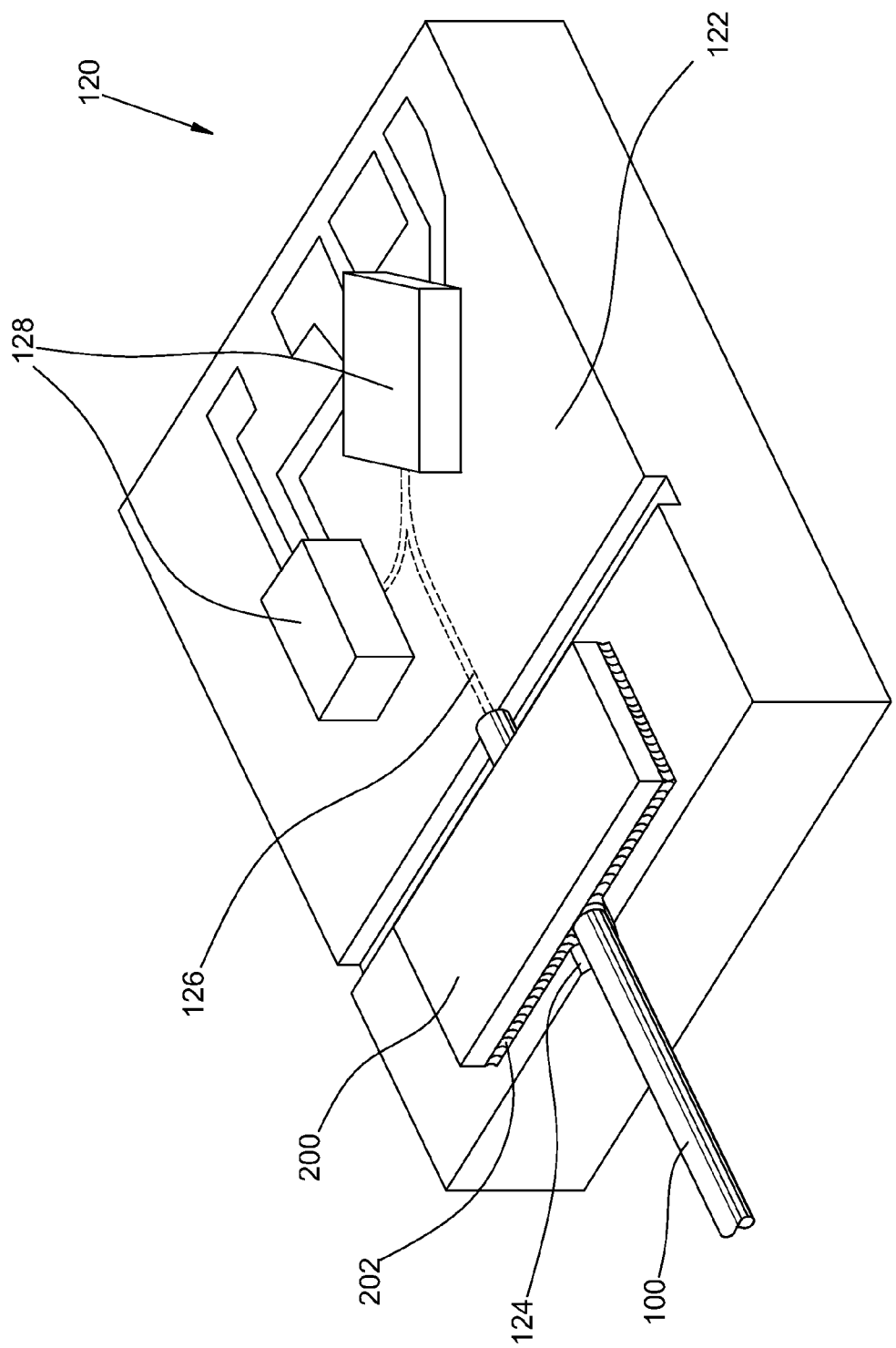
Figure 3A:
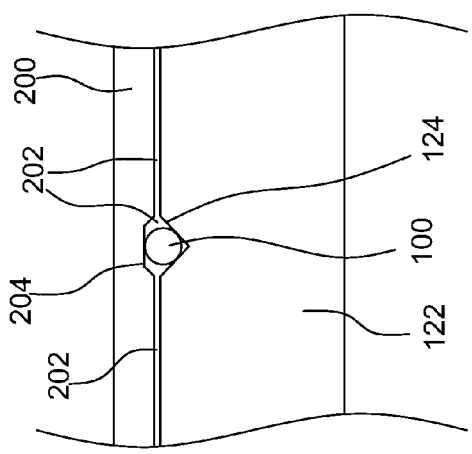
FIGS. 3A-3D illustrate various fiber grooves on a fiber retaining plate.
Figure 3B:
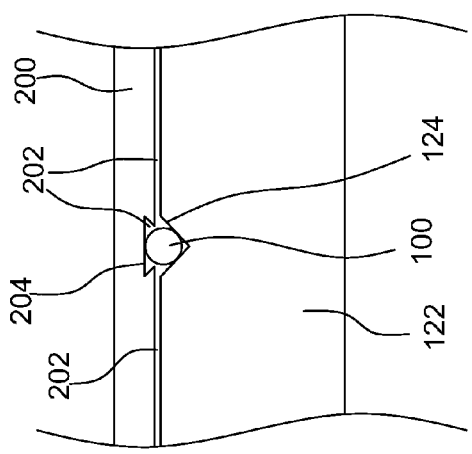
Figure 3C:
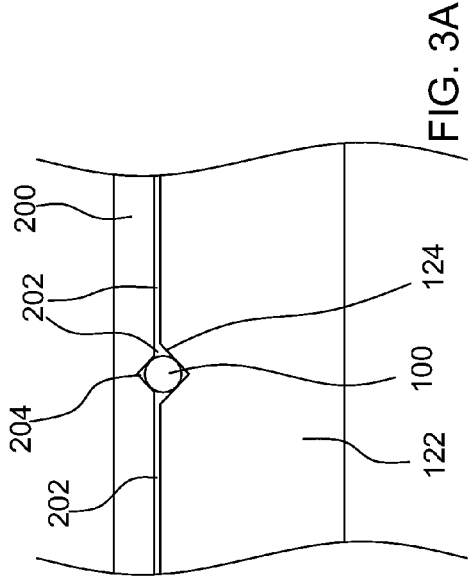
Figure 3D:
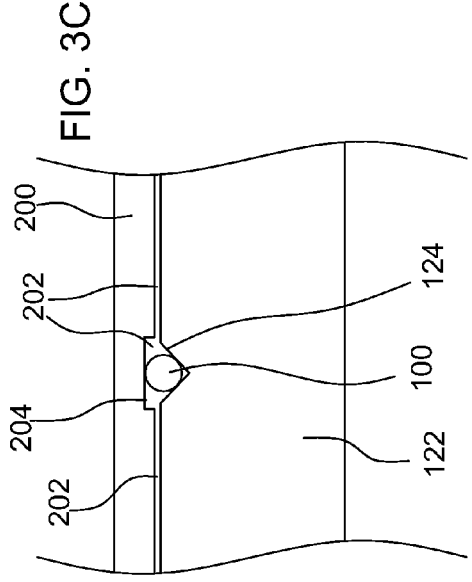

The embodiment shown in the Figures is exemplary, and should not be construed as limiting the scope of the present disclosure and/or appended claims.

DETAILED DESCRIPTION OF EMBODIMENTS

FIGS. 1A and 1B illustrate schematically an optical device assembly 120 comprising optical components 126 and 128 on device substrate 122. The optical components may include, but are not limited to, one or more of: planar waveguide(s); laser(s); amplifier(s); modulator(s); photodetector(s); focusing and/or polarization optics; optical gratings; optical filter(s); and so on. Optical coupling between the components 126 and 128 may be achieved in any suitable way, including but not limited to end-coupling, free-space-coupling, and transverse-coupling. The device substrate 122 has a fiber groove 124 formed on its top surface. Note that the terms "top", "bottom", "up", "down", and so on as used herein are defined relative to the device substrate, and not to any absolute orientation. The "top" of the device substrate is the surface on which the optical components 126/128 are positioned and the fiber groove 124 is formed. An optical fiber segment 100 is engaged with the fiber groove 124, which is positioned on the device substrate 122 so as to position the end of fiber segment 100 for optical coupling with component 126. In the particular examples shown in the Figures, component 126 comprises a planar waveguide formed on device substrate 122 and positioned for optical end-coupling with fiber segment 100 engaged in fiber groove 124. The planar waveguide may be a ridge waveguide, a buried waveguide, or other suitable planar waveguide type. However, any other optical component optically coupled to fiber segment 100 in any suitable way shall also fall within the scope of the present disclosure and/or appended claims.

A fiber retainer is employed to maintain the end of fiber segment 100 in engagement with fiber groove 124, and thereby also maintain optical coupling between component 126 and fiber segment 100. In one embodiment, illustrated schematically in FIGS. 2A-2D, 3A-3D, 4A-4D, 5A-5D, and 6A-6D, a fiber retainer comprises a retaining plate 200 and is secured with adhesive means to device substrate 122 over the end of the fiber segment 100 and the fiber groove 124. In another embodiment, illustrated schematically in FIGS. 7A-7D, a fiber retainer comprises a resilient retainer 300 engaged with the device substrate and biased so as to urge the end of the fiber segment 100 into the fiber groove 124. An alternative configuration of such an embodiment is illustrated schematically in FIGS. 8A-8D. Each of these embodiments is described in further detail hereinbelow.

In FIGS. 2A-2D, the fiber retainer comprises a retaining plate 200 secured to device substrate 122 over a portion of fiber groove 124 and the end of fiber segment 100 engaged therewith. Adhesive means comprising adhesive layer 202 serves to secure the retaining plate 200 to the device substrate 122. The adhesive means may also partially encapsulate a portion of fiber segment 100 engaged with fiber groove 124. Adhesive means suitable for forming adhesive layer 202 may include, but are not limited to, polymers, solder, glass, or any other suitable materials that may form layer adhesive layer 202 and adhere sufficiently to retaining plate 200 and device substrate 122.

For many optical device assemblies, substrate 122 comprises silicon, often with additional material layers such as a silica layer. Other suitable device substrate material(s) may be employed. Retaining plate 200 may comprise silicon, or any other suitably rigid material. The retaining plate 200 is shown as a simple flat plate in FIGS. 2A-2D, however, the fiber retainer may assume any suitable shape. In FIGS. 3A-3D, the retaining plate 200 is shown with a fiber groove 204 on its underside for engaging fiber segment 100. Such a groove may assist in properly positioning the retaining plate 200, and may also enable use of a thinner adhesive layer 202 for securing the retaining plate 200 and the substrate 122. Such fiber grooves 204 on retaining plate 200 may assume any of the exemplary cross-sectional shapes shown in FIGS. 3A-3D, or may assume any other suitable cross-sectional shape. At least a portion of fiber groove 204 may be at least partially filled with adhesive means when device substrate 122, fiber segment 100, and retaining plate 200 are assembled and secured with the adhesive means. The particular arrangement of FIG. 3D, in which the opening of fiber groove 204 is smaller in transverse extent than deeper portions of the groove, may enhance adhesion of the adhesive means to the retaining plate 200. The adhesive means within groove 204 (as in FIG. 3D) may form a retaining member with at least a portion thereof larger than the opening of the fiber groove 204. Such an enlarged retaining member may serve to secure the retaining plate 200 to the substrate 122 even if adhesion of the adhesive means to the plate 200 diminishes or fails completely. This type of arrangement for securing the retaining plate to the substrate may be employed independently of fiber groove 204, as described further below.

Either or both of device substrate 122 and retaining plate 200 may be provided with one or more recessed regions 206, shown in cross-section in FIGS. 4A-4D and 5A-5D. Note that any of the cross-sections may represent a circumscribed cavity, pit, or hole (of any suitable shape) or the cross section of an elongated slot. When retaining plate 200 is assembled with device substrate 122, some of the adhesive means at least partially fills recessed regions 206, thereby forming retaining members 208 within the recessed regions 206, in addition to adhesive layer 202. A retaining member 208 may include at least a portion thereof that is larger in at least one transverse dimension than the opening of the corresponding recessed region 206 (as if FIGS. 4A-4D and 5A-5C). In this way, the retaining member 208 serves to secure the retaining plate or device substrate to the adhesive layer, even if the adhesion of the adhesive layer 202 has diminished or failed entirely (which may occur for a variety of reasons, including but not limited to: device age; temperature variation within or beyond a typical device operating temperature range between about −40° C. and about 95° C.; humidity variations or extremes; thermal cycling; and so forth). However, even if the retaining member 208 is not larger than the opening of the recessed region 206 (as in FIG. 5D), the resulting increased surface area of contact may enhance adhesion between the adhesive means and the retaining plate 200 and/or device substrate 122. The recessed regions may be configured or arranged in a variety of ways, and those set forth herein are exemplary and should not be construed as limiting the scope of the present disclosure or the appended claims.

Figure 4A:
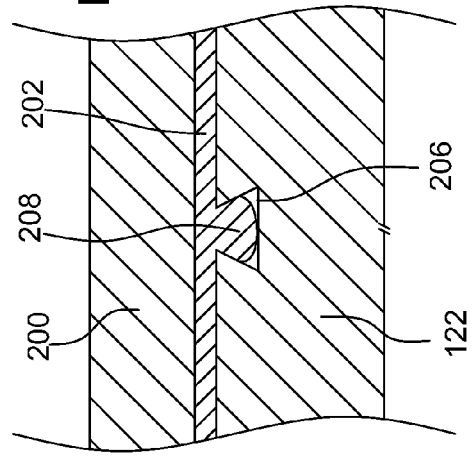
Figure 4B:
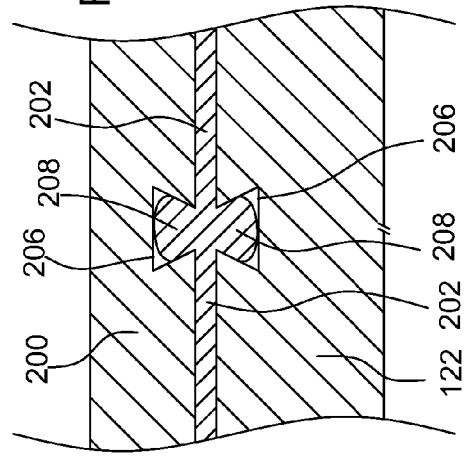
Figure 4C:
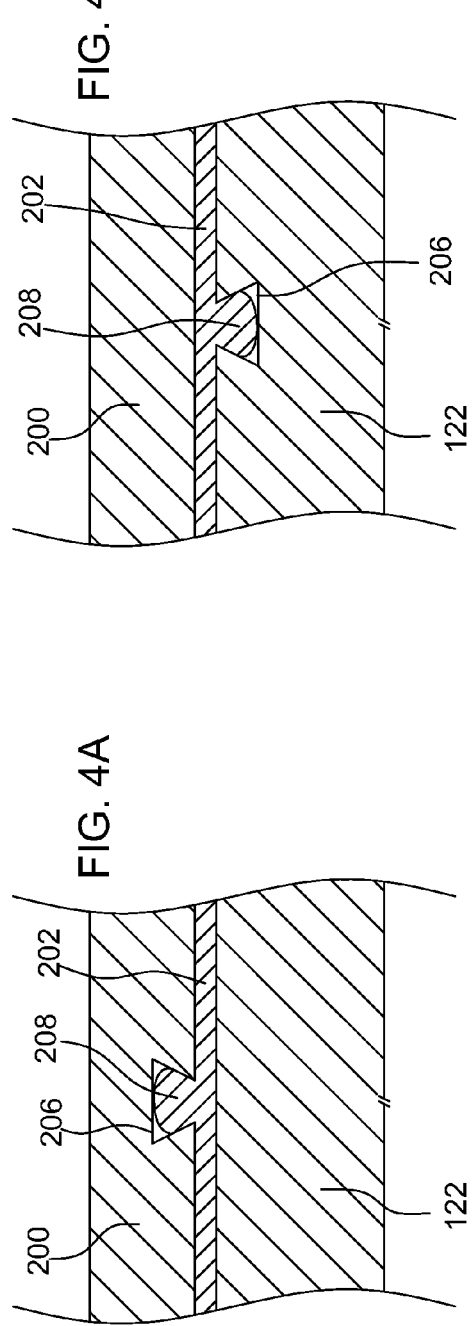
Figure 4D:
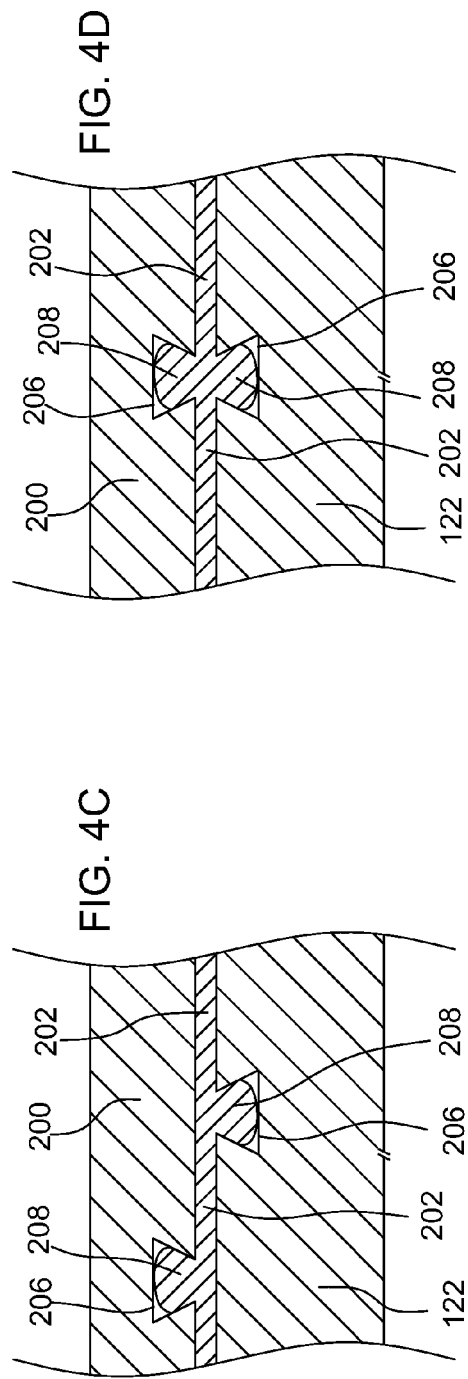

Recessed region(s) 206 may be provided on only the retaining plate (FIG. 4A), only the device substrate (FIG. 4B), or on both (FIGS. 4C-4D). If provided on both structures, the recessed regions may be arranged as substantially opposing pairs (FIG. 4D), or offset from one another (FIG. 4C). If arranged as opposing pairs, it should be noted that the alignment of such opposing pairs depends on the accuracy of placement of retaining plate 200 on device substrate 122. In most cases such placement need not be held within tight tolerances, and the same tolerance would apply to the alignment of opposing pairs of recessed regions 206.

The recessed regions 206 may be arranged or configured in a variety of ways to yield retaining members 208 that cannot pass back through the opening of the recessed regions. The recessed region 206 may be formed so that its opening is smaller in at least one transverse dimension than a deeper portion thereof. Such an undercut recessed region may be formed by any suitable process. If the retaining plate or device substrate comprises silicon or other crystalline material, then a directional etching process may be employed to yield structures resembling those of FIGS. 4A-4D. Alternatively, the retaining plate or device substrate may comprise an overlayer on a substrate material (for example, an overlayer of silica on a silicon substrate), and an etch process employed that selectively etches the substrate material. As shown in FIG. 115A, an opening of the desired shape is formed through the overlayer (layer 122a on device substrate 122; layer 200a on retaining plate 200) and the etch process selectively removes the substrate material, leaving an undercut recessed region 206 (as in FIG. 5A). It should be noted that the retaining member 208 need not fill the entire recessed region 206, but needs only form a portion that is larger in at least one transverse dimension than the opening thereof.

Any suitable adhesive means may be employed that can form adhesive layer 202 with sufficient adhesion to retaining plate 200 and device substrate 122 and that can form retaining members 208 within recessed regions 206. A suitable adhesive means will typically be capable of flowing during a portion of its application, so that the adhesive means may flow into recessed regions 206. Upon hardening or solidifying, retaining members 208 are formed. Examples of suitable adhesive means may include, but are not limited to: cured polymer (thermally or photochemically cured; including epoxy polymers), reflowed polymer, reflowed solder, reflowed glass, fused glass frit, and so on. In each example, at some stage of application the adhesive means may flow into the recessed regions. Upon hardening or solidifying (curing of a fluid polymer precursor; cooling of a heat-reflowed polymer, solder, or glass; cooling of a heat-fused glass frit; and so forth), the retaining members 208 are formed.

To facilitate flow of adhesive means into the recessed region 206, the recessed region may include a second opening, on the opposing side of the retaining plate 200 (FIGS. 5B-5C) or device substrate 122 (not shown). A second opening may facilitate flow of adhesive means (fluid precursor, reflowed material, frit, etc) into the recessed region. The recessed region may increase in size in at least one transverse dimension with distance from the first opening, as in FIG. 5B, thereby yielding a retaining member 208 too large to pass through the first opening. If the recessed region does not increase in size, an enlarged portion of a retaining member 208 may be formed by adhesive means (such as polymer) emergent from the second opening, as in FIG. 5C. Alternatively, the retaining member may lack a portion larger than the opening of the recessed region (as in FIG. 5D) but may nevertheless enhance adhesion between the adhesive means and the retaining plate and/or device substrate (through increased surface area of contact).

Figure 6A:
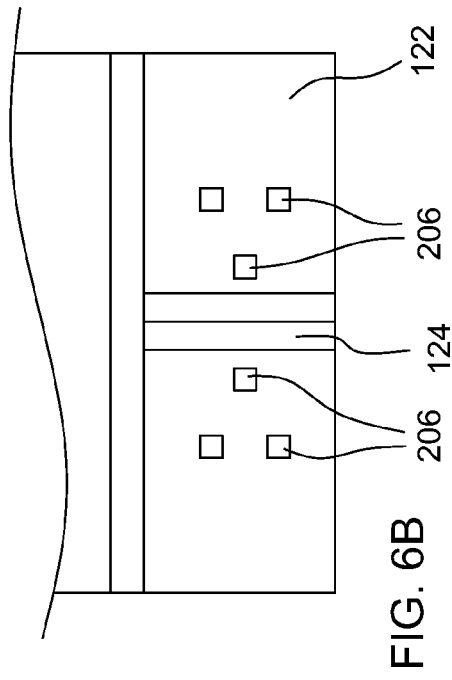
Figure 6B:
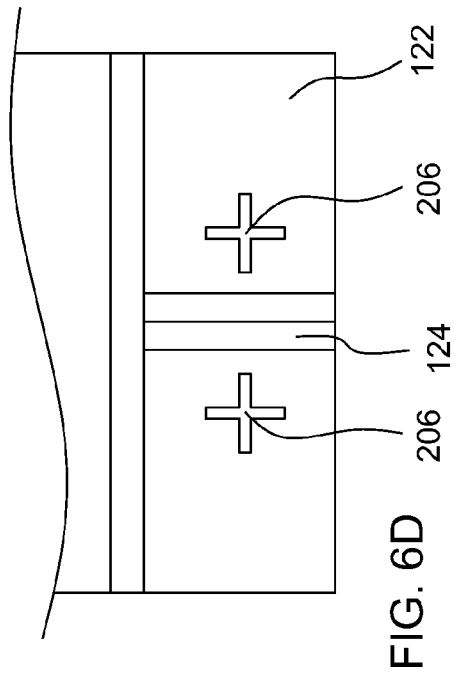
Figure 6C:
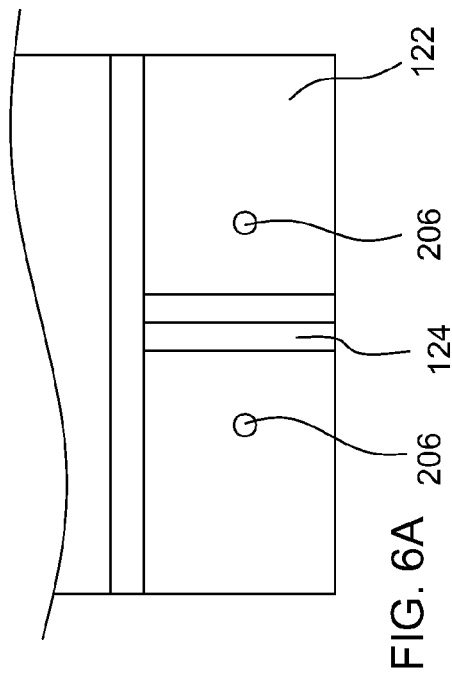
Figure 6D:
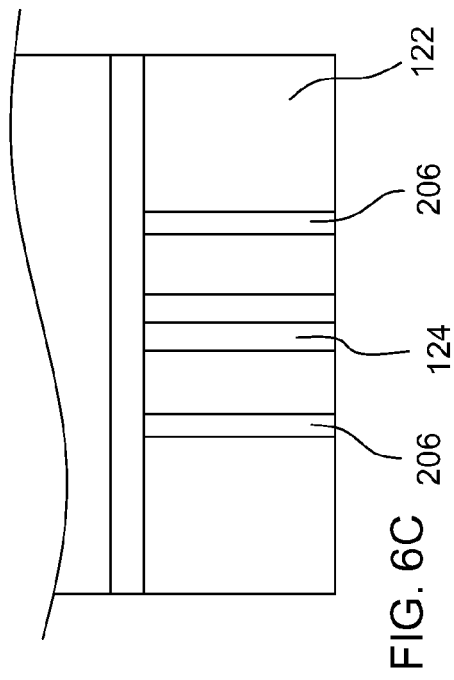

FIGS. 6A-6D illustrate a variety of arrangements of multiple recessed regions 206 on device substrate 122. Similar arrangements of multiple recessed regions may be provided on retaining plate 200. Other suitable arrangements may be employed. Only the openings of the recessed regions 206 are shown in FIGS. 6A-6D; any enlargement or undercutting is not shown explicitly. FIGS. 6A and 6B illustrate a number of circumscribed cavities formed on the device substrate. Additional cavities may provide stronger bonding between the adhesive layer 202 and the device substrate 122 and/or the retaining plate 200. FIG. 6C illustrates multiple slots formed on the device substrate. The slots may extend to the edge of the device substrate (as in FIG. 6C), to increase the area of the slots and thereby strengthen the bond between the adhesive layer 202 and the device substrate 122 and/or the retaining plate 200, and/or to facilitate flow of adhesive means into the slots. Slots may cross one another, as in FIG. 6D, for the same reasons.

By providing recessed areas 206 and forming retaining members 208 therein, the adhesive layer 202 may remain secured to retaining plate 200 and/or device substrate 122 even if adhesion between the layer and these structures diminishes or fails completely. The bonded structures (substrate 122 and plate 200) are held in place not only by adhesion of layer 202 thereto, but also by cohesion of layer 202 and retaining members 208 in recessed areas 206. Such cohesion may persist, and may therefore prolong the usable life of the device, even after adhesion has been disrupted by temperature and/or humidity variations and/or extremes, thermal cycling, aging of the device, and/or other factors that may lead to failure of the adhesive.

In some instances, shrinkage of adhesive layer 202 as it cures may generate strain on the layer 202, retaining plate 200, substrate 122, or optical fiber 100. Such strain may contribute to failure of adhesion between layer 202 and retaining plate 200 or substrate 122, failure of cohesion between layer 202 and retaining members 208, or structural failure of retaining members 208 or recessed areas 206. If necessary, this may be reduced or otherwise ameliorated several ways. Reducing the thickness of adhesive layer 202 may serve to reduce the available strain energy per unit area, or may serve to increase the relative strain relief afforded by compliance of the optical fiber 100. The thickness of adhesive layer 202 generally would not exceed about 60 µm (i.e., a few µm less than half the typical diameter of optical fiber 100), is typically less than about 10 µm thick, and in some cases may be as thin as about 2-4 µm. The retaining plate 200 may comprise a resilient material, such as a thin metal plate or a thin plastic plate. The resilience of the retaining plate may be made sufficient to relieve or reduce the strain induced by shrinkage of the adhesive layer 202 as it cures. Alternatively, a resilient, compliant, compressible, or deformable material may be placed within groove 204 between the retaining plate 200 and the fiber segment 100. Such intervening material may at least partially relieve strain resulting from shrinkage of adhesive layer 202. An example of a suitable material is silica grown, deposited, or otherwise formed within groove 204 on a silicon retaining plate 200. Other intervening materials and other retaining plate materials may be equivalently employed.

In some instances, differences in thermal expansion properties of the adhesive means and the optical fiber may contribute to failure of adhesion between layer 202 and retaining plate 200 or substrate 122, to failure of cohesion between layer 202 and retaining members 208, or to structural failure of retaining members 208 or recessed areas 206. If necessary, this may be ameliorated several ways. The retaining plate 200 may comprise a resilient material, such as a thin metal plate or a thin plastic plate. The resilience of the retaining plate may be made sufficient to accommodate differing thermal expansions of the adhesive means and the fiber segment so as to substantially eliminate separation of the adhesive means from the retaining plate or the substrate due to differential expansion, and thereby also substantially prevent disengagement of the fiber segment from the fiber groove over a desired operating temperature range (for example between about −40° C. and about 95° C.). Such a resilient retaining plate should nevertheless have a thermal expansion coefficient sufficiently small (less than about $10^{-5}/°$ C.) so that undue shear stresses do not develop as a result of differential expansion of retaining plate 200 and device substrate 122. ASTM F-15 alloy (i.e., Kovar®) is an example of a suitable material for fabricating retaining plate 200; other material(s) may be used as well. Alternatively, a resilient material may be placed in groove 204 between the retaining plate 200 and the fiber segment 100. The resilience of such material may be made sufficient to accommodate or partially compensate differing thermal expansions of the adhesive means and the fiber segment, as described above.

FIGS. 7A-7D and 8A-8D illustrate alternative embodiments wherein the fiber retainer comprises a resilient fiber retainer 300/400 positioned over the fiber segment, engaged with the device substrate 122, and biased so as to urge the fiber segment 100 into fiber groove 124. The resilient fiber retainer 300/400 may comprise metal, polymer, or other suitable resilient material or combination thereof. A second fiber groove 402 (shown on resilient fiber retainer 400 in FIGS. 8A-8D; not shown but may be equivalently provided on resilient fiber retainer of FIGS. 7A-7D) may be provided for engaging the fiber segment 100.

Figure 7A:
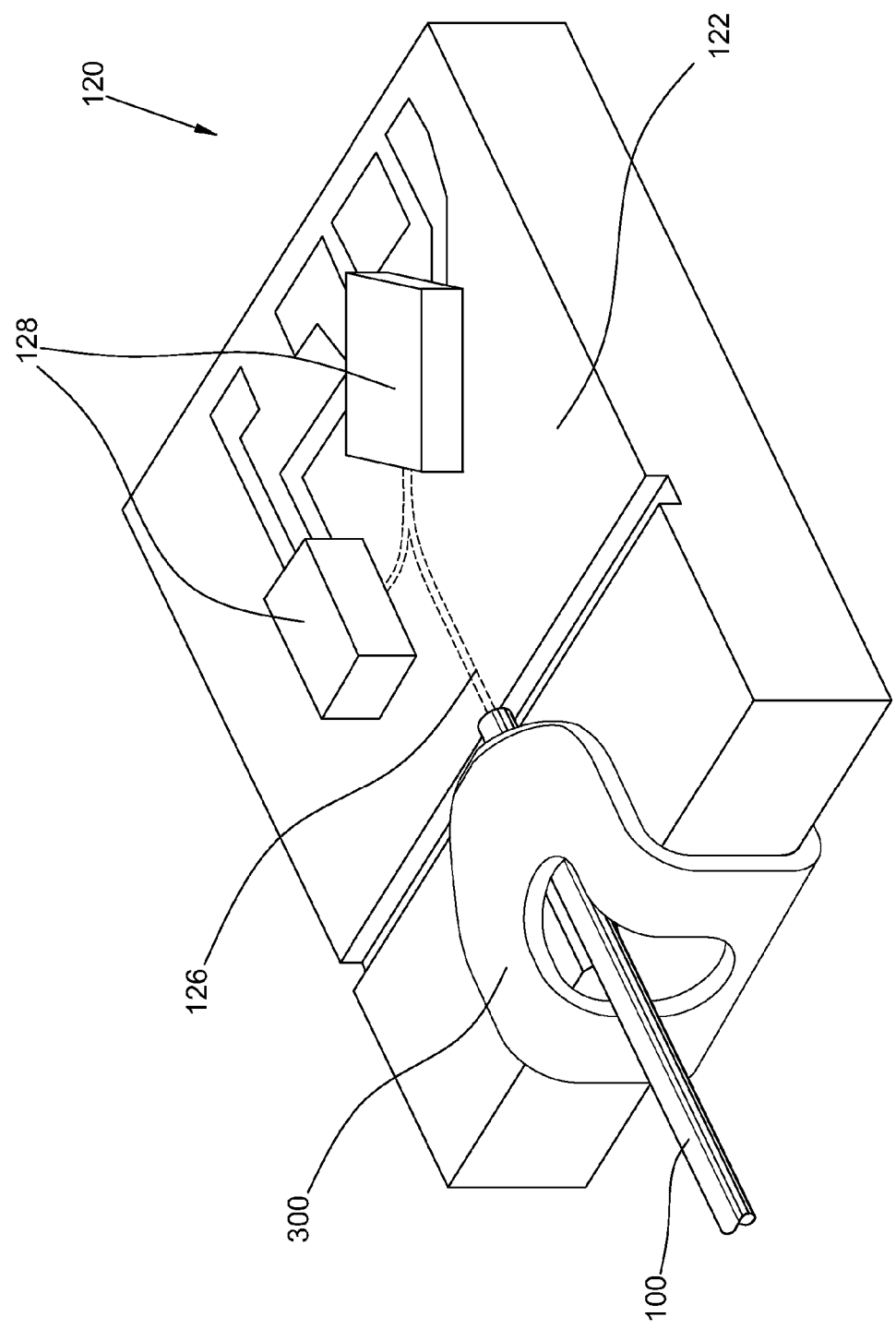

The resilient fiber retainer 300 illustrated in FIGS. 7A-7B comprises opposed members resiliently biased toward one another. The fiber retainer 300 engages the device substrate 122 at the front edge thereof (i.e., at the edge intersected by the fiber groove 124), with the device substrate 122 and a portion of the fiber segment 100 between the opposed members (one above and one below the device substrate). The resilient bias of the opposed members urges the fiber segment 100 into the fiber groove 124. A hole may be provided through which the fiber segment 100 passes.

Figure 8A:
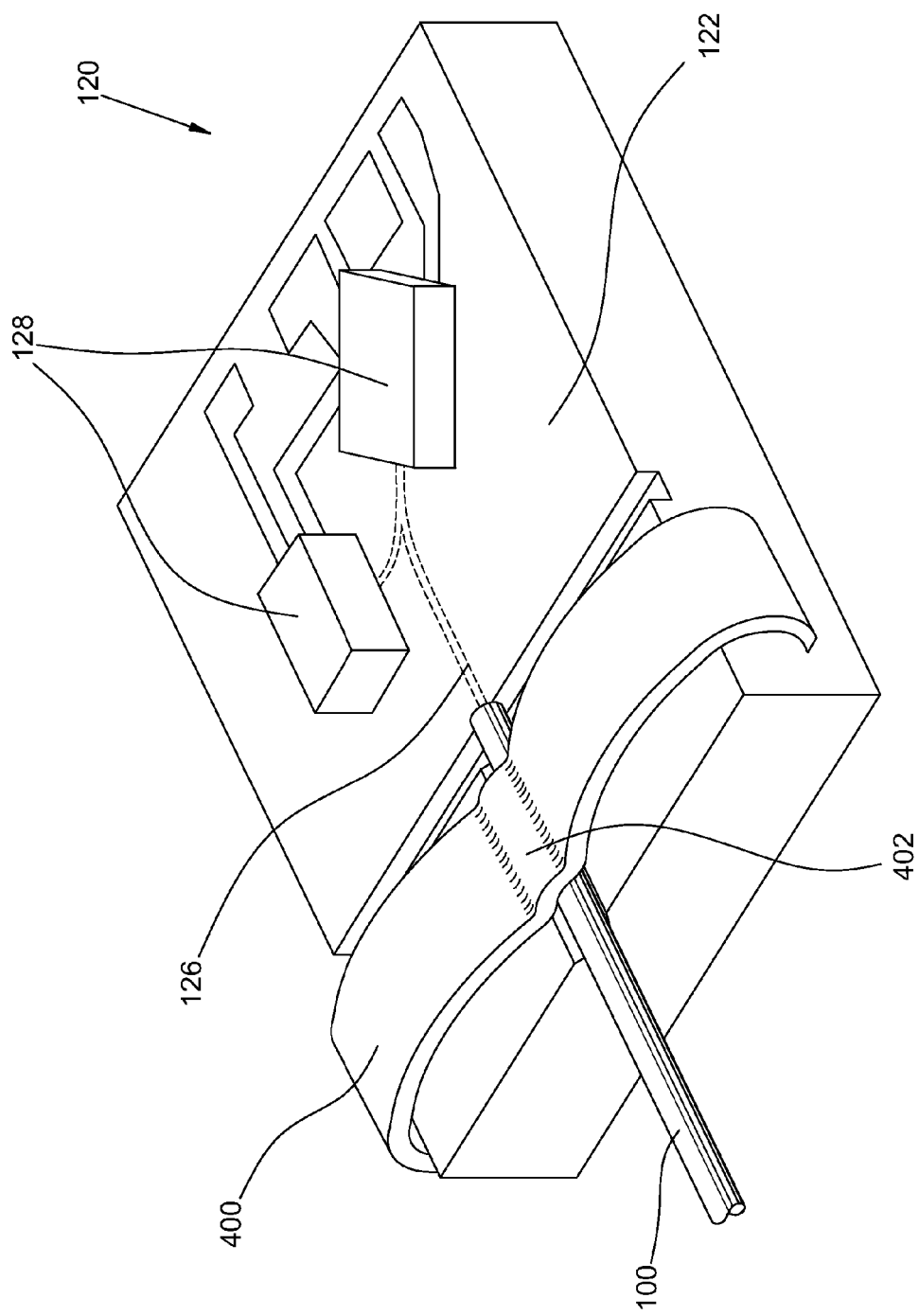
Figure 9:
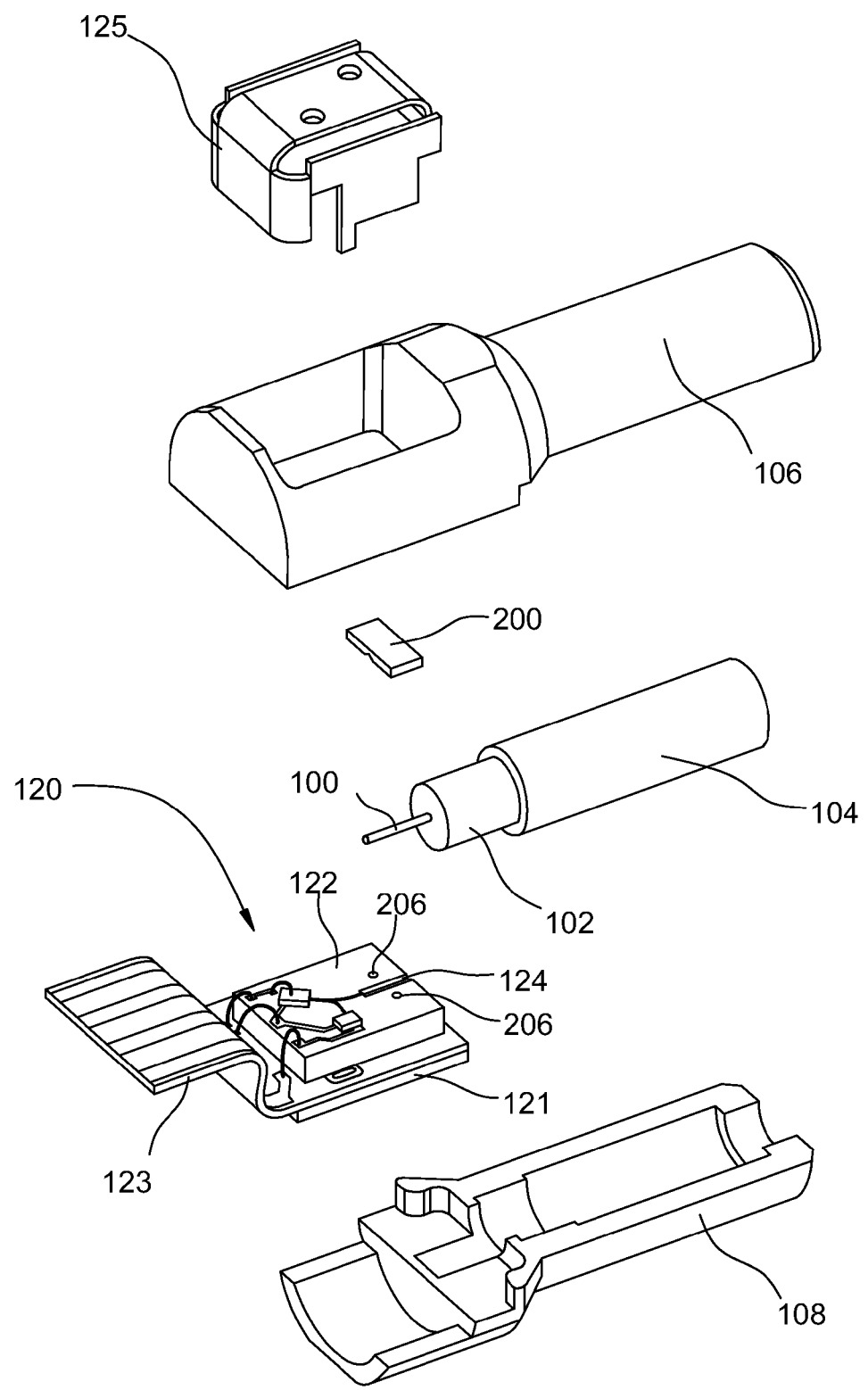
FIGS. 9-11 are exploded views of an optical device assembly, a fiber segment, a housing, and a fiber retainer.
Figure 10:
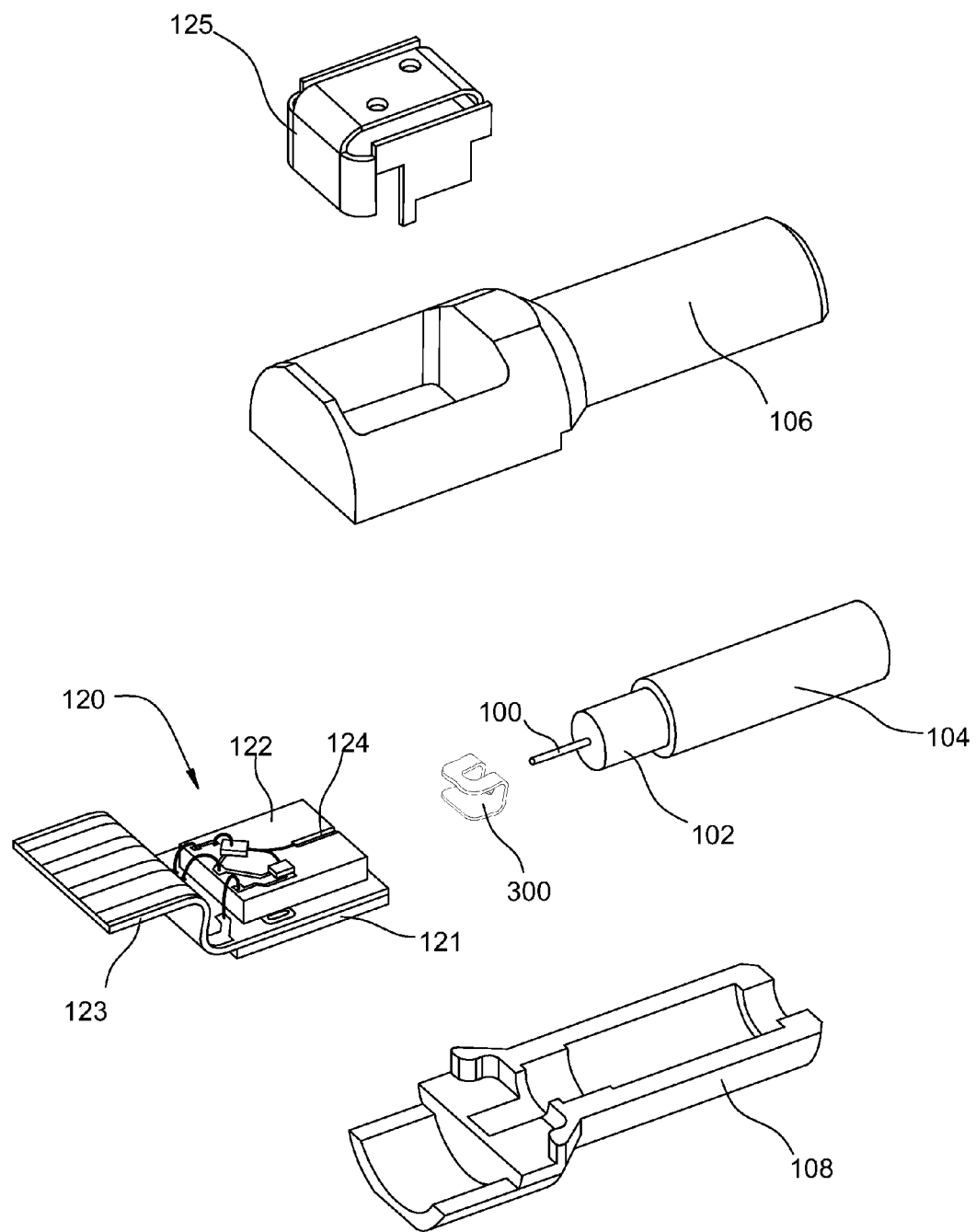
Figure 11:
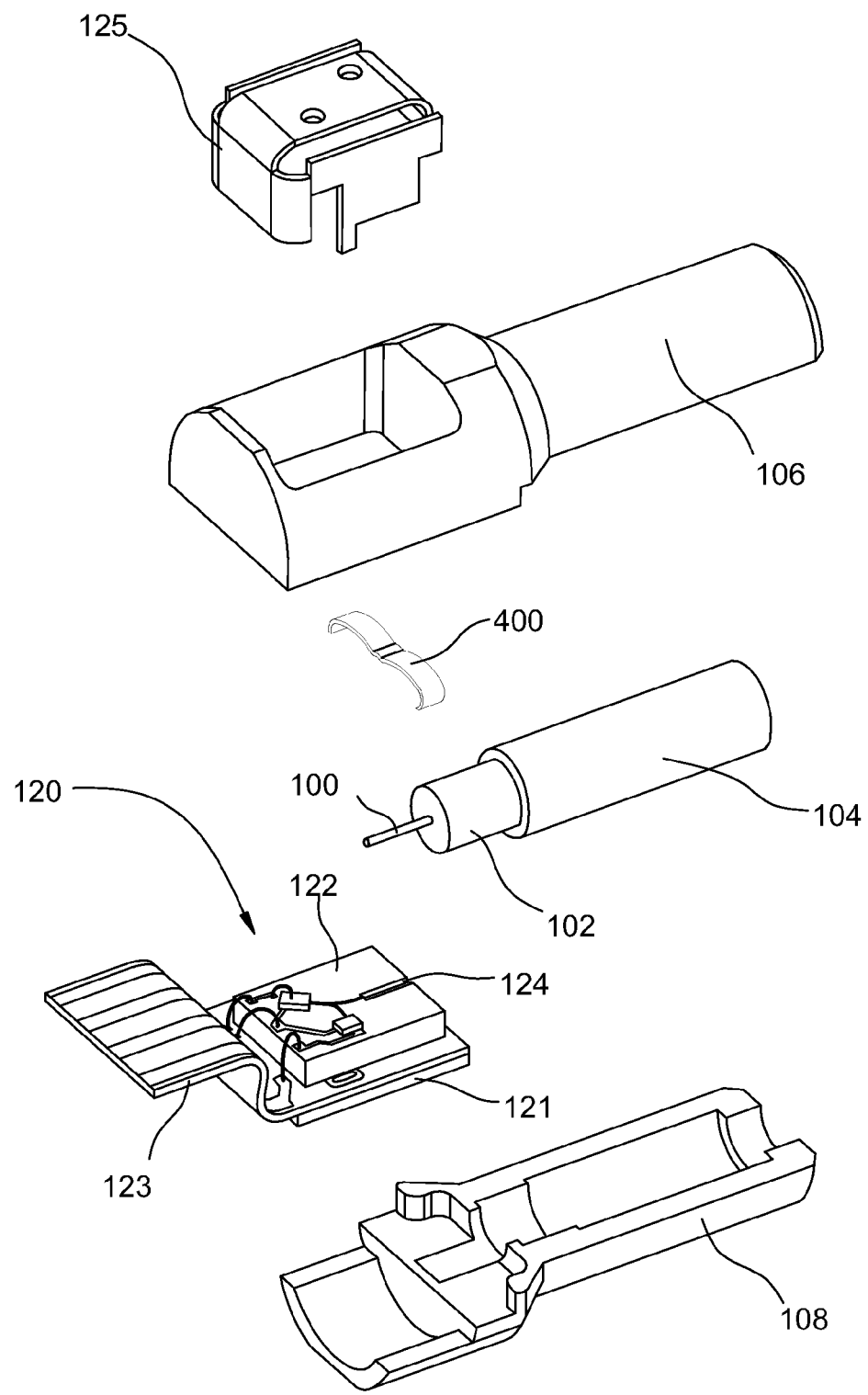
Figure 12:
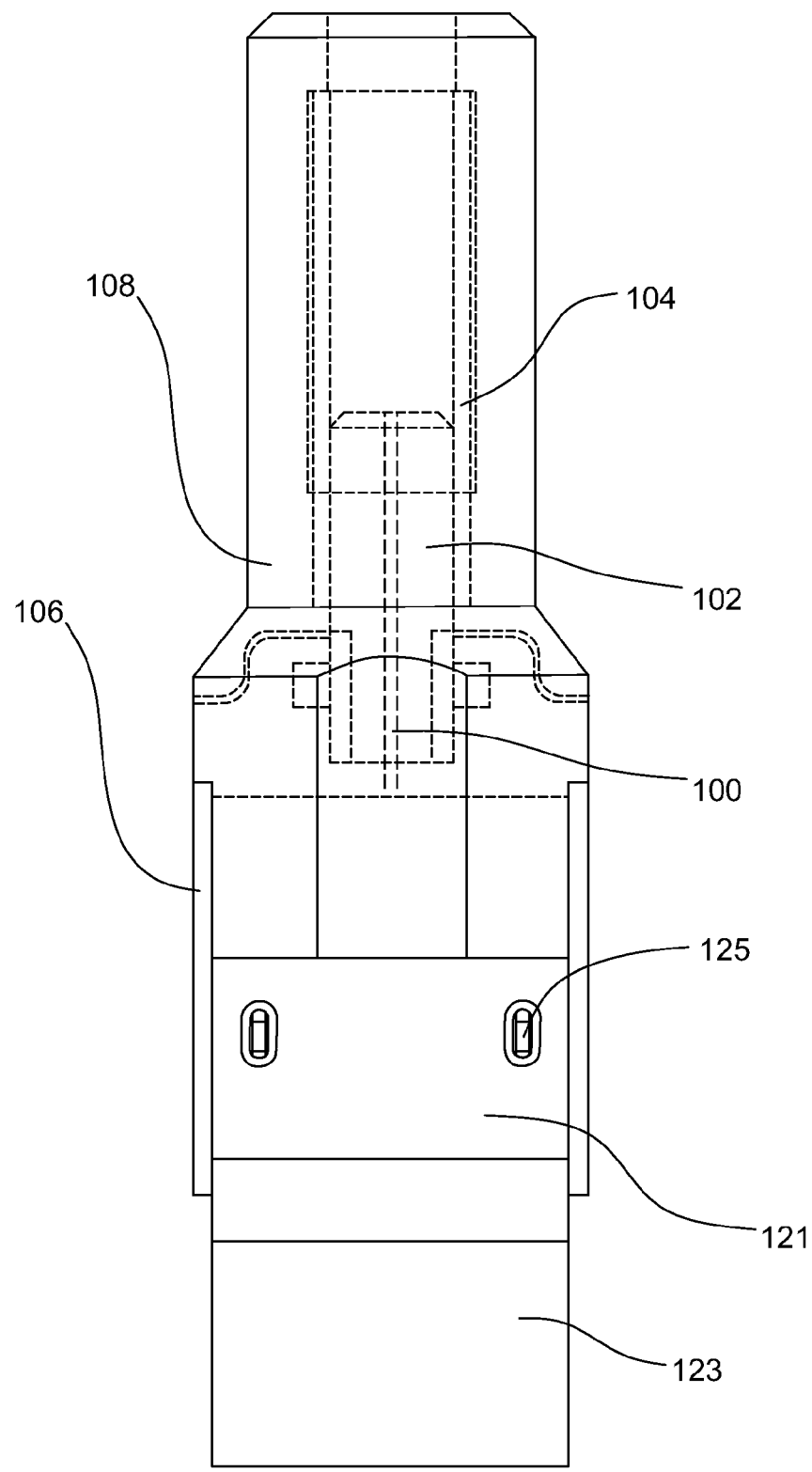
FIGS. 12-15 illustrate various configurations of a fiber segment and housing.

The resilient fiber retainer 400 illustrated in FIGS. 8A-8B comprises a central member and two lateral resilient members. The lateral members engage opposing lateral edges of the device substrate 122, with the fiber groove 124 and fiber segment 100 therebetween. The lateral members are forced downward against their resilient bias to engage their respective side edges of the device substrate, and thereby causing the resilient bias to urge fiber segment 100 into fiber groove 124. The opposing side edges of the device substrate 122 may be adapted for engaging the lateral members. Suitable adaptations may include one or more of, but are not limited to: indentations, detents, grooves, slots, ribs, tabs, and undercut surfaces.

The optical device assembly 120 and fiber segment 100 coupled thereto as variously described hereinabove may be secured within a housing 106/108 so as to at least partially enclose the fiber segment and the optical device (FIGS. 9-16). The housing may be configured or adapted in various ways to enable optical coupling of the fiber segment 100 at its second end to another optical fiber. The device assembly 120 may be secured to a mounting plate 121, and electrical connections to one or more components of device assembly 120 may be made via a circuit element 123 (which may comprise a flexible circuit element or a circuit element of any other suitable type). An electromagnetic shield 125 may be secured to the device substrate to enclose at least one component of the device assembly 120.

In FIGS. 9-12, the fiber segment 100 is received within a fiber ferrule 102, with the first end of the fiber segment protruding from the first end of the fiber ferrule and the second end of the fiber segment substantially flush with the second end of the fiber ferrule. The fiber ferrule 102 is received within fiber sleeve 104, which is in turn mounted within housing 106/108. A mating fiber optical connector received within the fiber sleeve 104 aligns the second end of fiber segment 100 with a second optical fiber for end-coupling. Other configurations for housing 106/108 (which may or may not include fiber ferrule 102 and/or fiber sleeve 104) may be employed for thus engaging a mating fiber optical connector.

Figure 13:
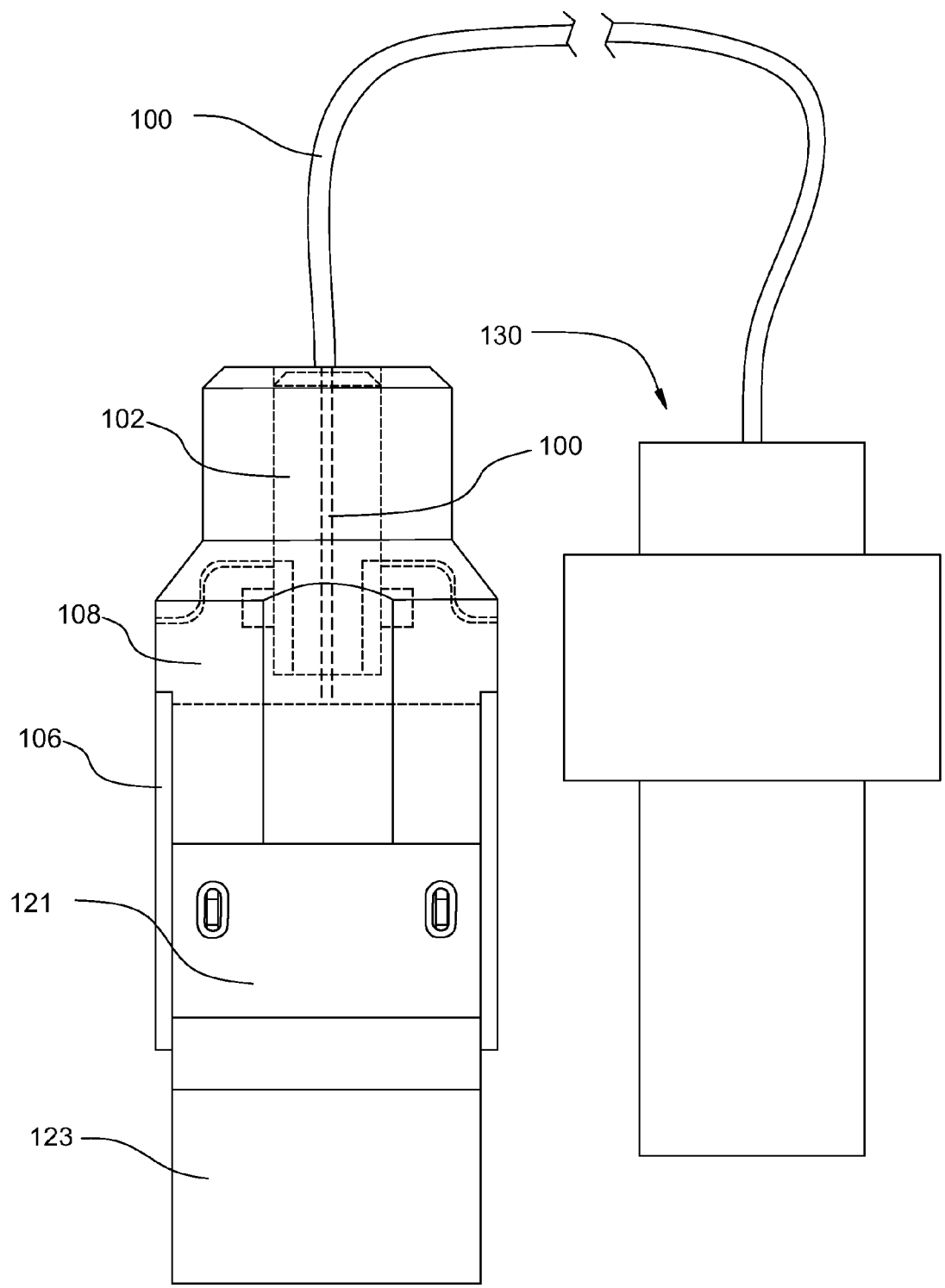
Figure 14:
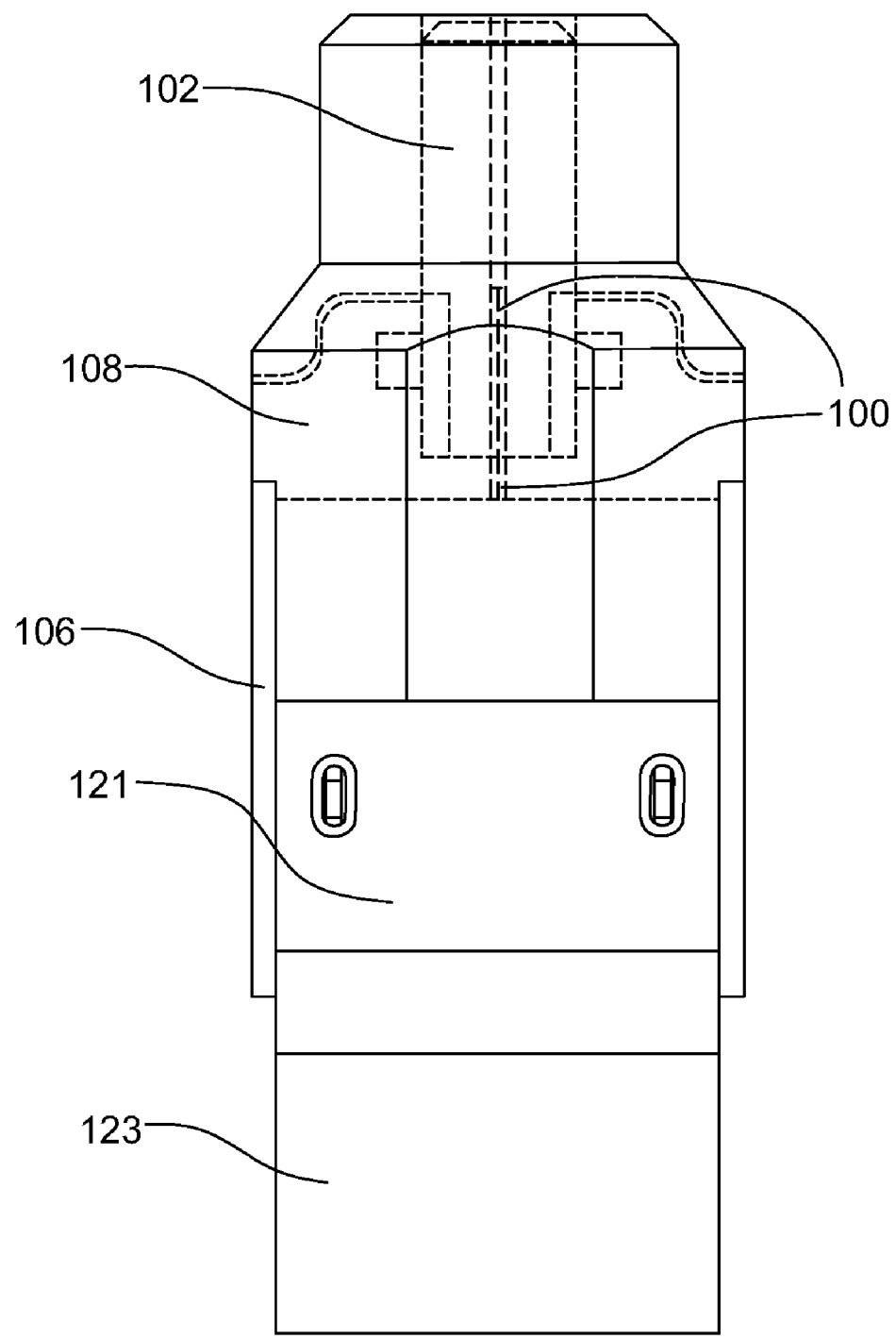
Figure 15:
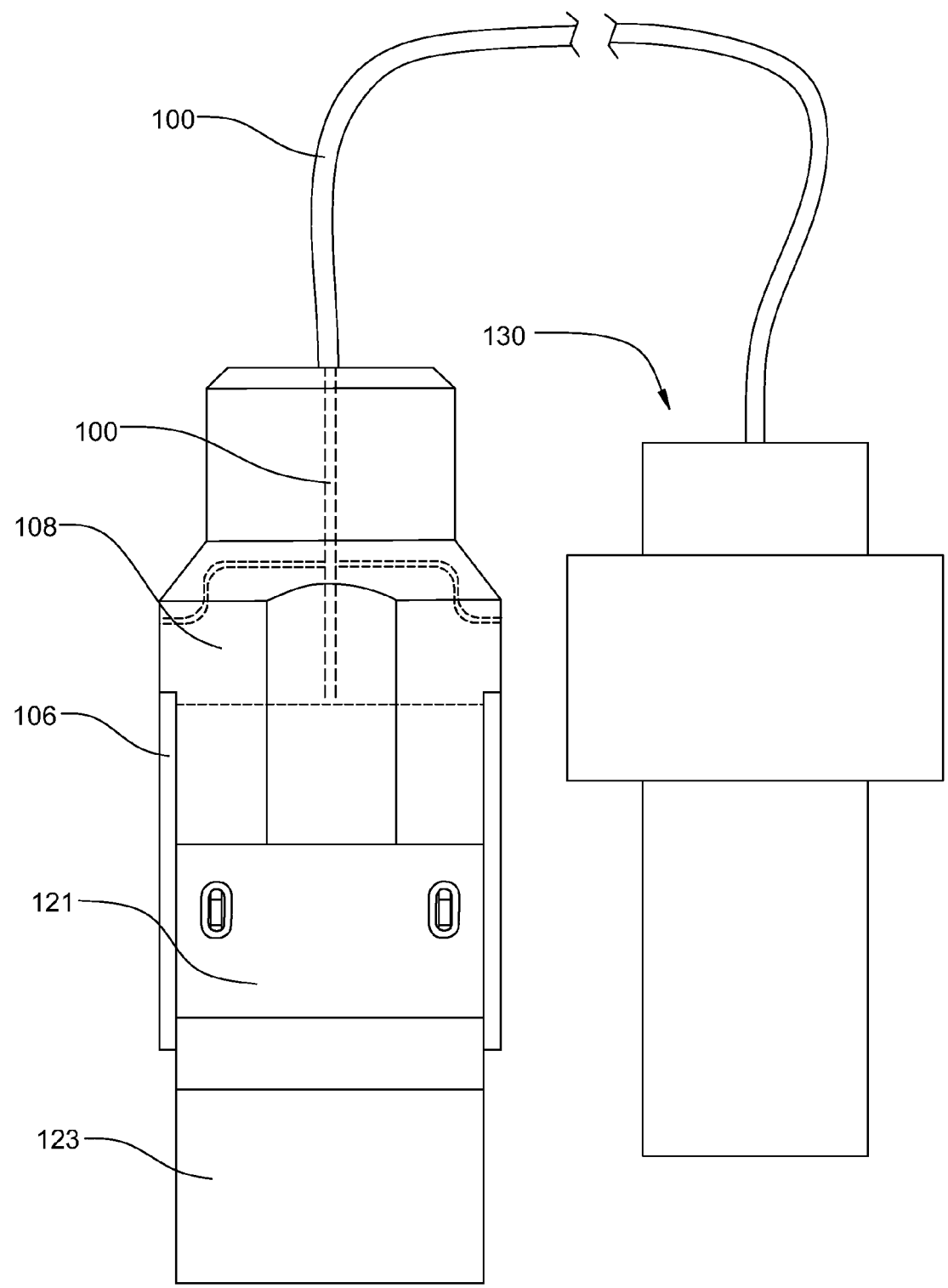

In FIG. 13, the second end of the fiber segment 100 protrudes from the second end of the fiber ferrule 102 as a fiber pigtail, with or without a fiber optical connector 130 (which may be of any suitable type or configuration). In FIG. 14, the second end of fiber segment 100 terminates within fiber ferrule 102, which serves as a receptacle for another optical fiber segment. The other optical fiber segment may be inserted into fiber ferrule 102 and pushed against the second end of fiber segment 100 for end coupling therewith. In FIG. 15, the second end of fiber segment 100 simply exits housing 106/108, thereby serving as a fiber pigtail, with or without a fiber optical connector 130 (which may be of any suitable type).

Figure 16:
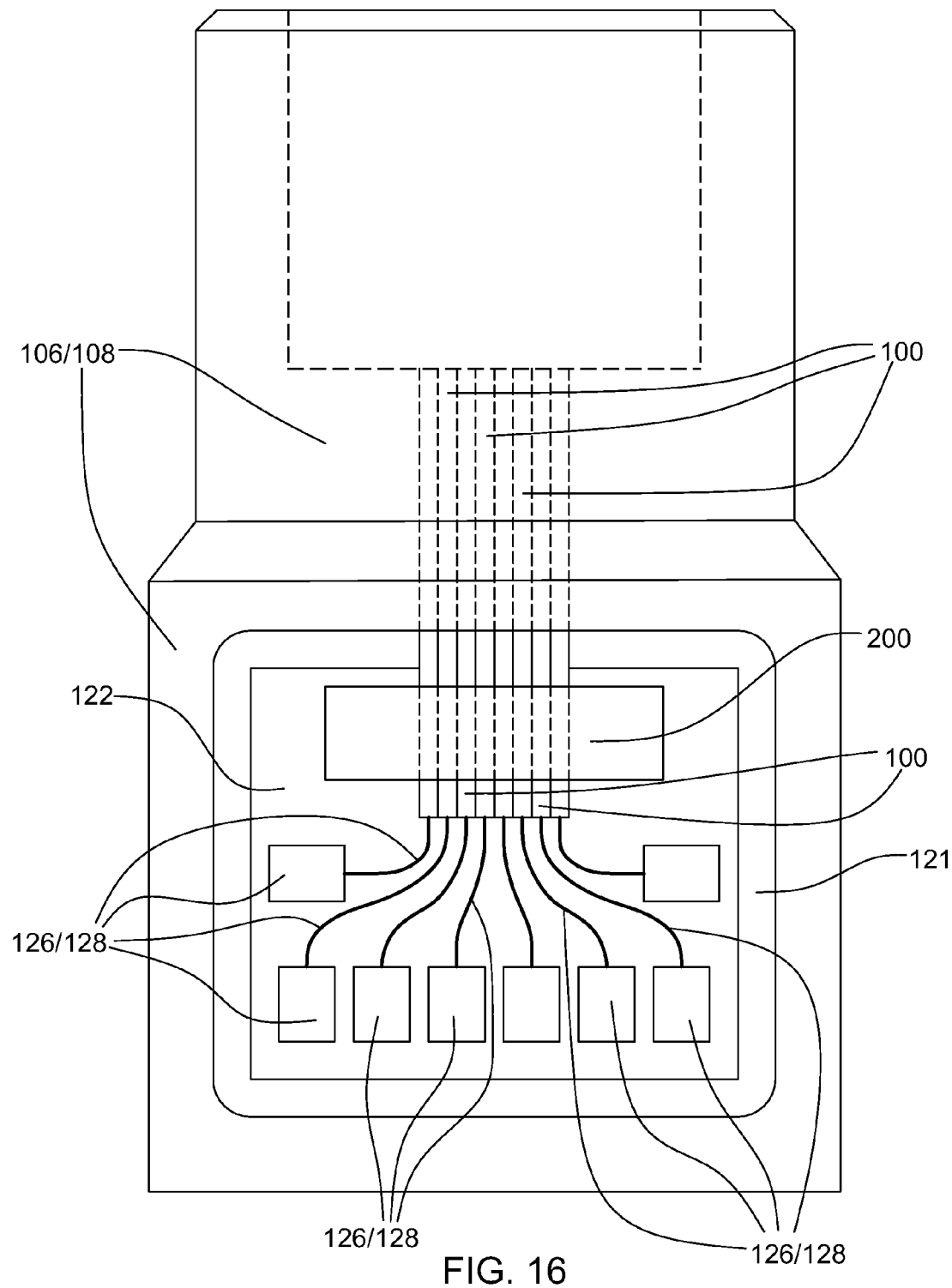
FIG. 16 illustrates an optical device assembly, multiple fiber segments, a fiber retainer, and a housing.

In FIG. 16, multiple fiber segments 100 are engaged in multiple corresponding fiber grooves. A retaining plate 200 as described hereinabove may be employed for retaining the fiber segments engaged with the corresponding grooves. Alternatively, a resilient fiber retainer similar to retainer 300 of FIGS. 7A-7D or similar to retainer 400 of FIGS. 8A-8D, may be equivalently employed. The multiple fiber segments 100 may be positioned for optical coupling with multiple components 126/128 on device substrate 122. Housing 106/108 may be configured and/or adapted for engaging a mating multi-fiber connector.

Optical components assembled onto a substrate according to the teachings of the following references may be readily adapted according to the present disclosure for packaging and fiber-coupling. The references disclose assembly of optical devices onto a device substrate that includes one or more planar waveguides thereon. The assembled components may be optically coupled to the planar waveguide(s). One of the planar waveguides may be adapted for supporting an optical mode suitable for coupling to an optical fiber, and may be suitably positioned on the substrate relative to the fiber groove for optical coupling as set forth hereinabove. The following are incorporated by reference as if fully set forth herein:

U.S. non-provisional application Ser. No. 10/187,030 (U.S. Patent Application Pub. No. 2003/0081902) entitled "Optical junction apparatus and methods employing optical power transverse-transfer" filed Jun. 28, 2002 in the names of Henry A. Blauvelt, Kerry J. Vahala, David W. Vernooy, and Joel S. Paslaski; and U.S. non-provisional application Ser. No. 10/652,955 entitled "Optical assemblies for free-space optical propagation between waveguide(s) and/or fiber(s)" filed Aug. 29, 2003 in the names of Henry A. Blauvelt, David W. Vernooy, and Joel S. Paslaski.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An optical apparatus comprising:
   a device substrate with at least one optical component thereon and with a fiber groove thereon;
   a segment of optical fiber engaged with the fiber groove, the fiber groove positioning a first end of the fiber segment engaged therewith for optical coupling with at least one optical component on the substrate;
   a fiber retainer positioned over the fiber segment and engaged therewith so as to maintain the fiber segment in engagement with the fiber groove; and
   adhesive means for securing the fiber retainer to the device substrate, the adhesive means (a) forming at least one retaining member that at least partially fills at least one recessed region formed on the device substrate, that recessed region being spatially separate from the fiber groove, and (b) forming at least one retaining member that at least partially fills at least one recessed region formed on the fiber retainer, that recessed region being spatially separate from an area of the fiber retainer engaged with the fiber,
   wherein an opening of each recessed region is smaller in at least one transverse dimension than a deeper portion of that recessed region, so that at least a portion of each retaining member is larger in at least one transverse dimension than an opening of the corresponding recessed region.

2. The apparatus of claim 1 wherein the device substrate or the fiber retainer comprises silicon, and the recessed region comprises an etched region of the silicon.

3. The apparatus of claim 1 wherein the device substrate or the fiber retainer comprises silicon with a silica layer, and the recessed region comprises a selectively etched region of the silicon undercut below an opening through the silica layer.

4. The apparatus of claim 1 wherein the device substrate or the fiber retainer comprises silicon, and the recessed region comprises a directionally etched region of the silicon undercut below an opening in the surface of the silicon.

5. The apparatus of claim 1 wherein the recessed region comprises at least one blind, circumscribed cavity.

6. The apparatus of claim 1 wherein the recessed region comprises at least one elongated slot running substantially parallel to the substrate surface.

7. The apparatus of claim 6 wherein the device substrate or the fiber retainer has multiple recessed regions comprising slots, and at least two of the slots cross one another.

8. The apparatus of claim 6 wherein the slot extends to the edge of the device substrate or the fiber retainer, thereby allowing flowing adhesive means to flow through the slot.

9. The apparatus of claim 1 wherein the adhesive means comprises a hardened material that had flowed into the recessed region during at least a portion of its application.

10. The apparatus of claim 9 wherein the recessed region includes an opening that allows flowing adhesive means to flow through the device substrate or the fiber retainer.

11. The apparatus of claim 9 wherein the adhesive means comprises cured polymer, reflowed polymer, reflowed solder, refowed glass, or fused glass frit.

12. The apparatus of claim 1 wherein the fiber retainer includes a fiber groove thereon, and the first end of the fiber segment is engaged with the fiber groove of the fiber retainer.

13. The apparatus of claim 12 further comprising a resilient material in the fiber groove of the fiber retainer between the fiber segment and the fiber retainer, wherein the resilient material is sufficiently resilient so as to accommodate: (i) differing thermal expansions of the adhesive means and the fiber segment so as to substantially prevent disengagement of the fiber segment from the fiber groove over an operating temperature range between about −40° C. and about 95° C.; or (ii) strain induced by shrinkage of the adhesive means so as to substantially prevent disengagement of the fiber segment from the fiber groove.

14. The apparatus of claim 1 wherein the fiber retainer is sufficiently resilient to accommodate: (i) differing thermal expansions of the adhesive means and the fiber segment without allowing disengagement of the fiber segment from the fiber groove over an operating temperature range between about −40° C. and about 95° C.; or (ii) strain induced by shrinkage of the adhesive means without allowing disengagement of the fiber segment from the fiber groove.

15. The apparatus of claim 14 wherein thermal expansion coefficient of the fiber retainer is less than about $10^{-5}/°C$.

16. A method comprising:
engaging a segment of optical fiber with a fiber groove on a device substrate having at least one optical component thereon, the fiber groove positioning a first end of the fiber segment engaged therewith for optical coupling with at least one optical component on the substrate;
positioning a fiber retainer over the fiber segment and engaging the fiber retainer with the fiber segment so as to maintain the fiber segment in engagement with the fiber groove; and
applying adhesive means to secure the fiber retainer to the device substrate, the adhesive means (a) forming at least one retaining member that at least partially fills at least one recessed region formed on the device substrate, that recessed region being spatially separate from the fiber groove, and (b) forming at least one retaining member that at least partially fills at least one recessed region formed on the fiber retainer, that recessed region being spatially separate from an area of the fiber retainer engaged with the fiber,
wherein an opening of each recessed region is smaller in at least one transverse dimension than a deeper portion of that recessed region, so that at least a portion of each retaining member is larger in at least one transverse dimension than an opening of the corresponding recessed region.

17. A method comprising transmitting an optical signal between an optical fiber and an optical component on a device substrate, wherein:
a segment of the optical fiber is engaged with a fiber groove on the device substrate, the fiber groove positioning a first end of the fiber segment engaged therewith for optical coupling with the optical component, thereby enabling the optical signal to be transmitted between the optical component and the optical fiber;
a fiber retainer is positioned over the fiber segment and engaged therewith so as to maintain the fiber segment in engagement with the fiber groove;
adhesive means secures the fiber retainer to the device substrate, the adhesive means (a) forming at least one retaining member that at least partially fills at least one recessed region formed on the device substrate, that recessed region being spatially separate from the fiber groove, and (b) forming at least one retaining member that at least partially fills at least one recessed region formed on the fiber retainer, that recessed region being spatially separate from an area of the fiber retainer engaged with the fiber; and
wherein an opening of each recessed region is smaller in at least one transverse dimension than a deeper portion of that recessed region, so that at least a portion of each retaining member is larger in at least one transverse dimension than an opening of the corresponding recessed region.

* * * * *

UNITED STATES PATENT AND TRADEMARK OFFICE
CERTIFICATE OF CORRECTION

| | |
|---|---|
| PATENT NO. | : 7,625,132 B2 |
| APPLICATION NO. | : 11/754986 |
| DATED | : December 1, 2009 |
| INVENTOR(S) | : Benzoni et al. |

Page 1 of 1

It is certified that error appears in the above-identified patent and that said Letters Patent is hereby corrected as shown below:

Column 9, line 6, replace the words "ref owed" with --reflowed--.

Signed and Sealed this

Twenty-third Day of February, 2010

David J. Kappos
*Director of the United States Patent and Trademark Office*